July 14, 1953 E. I. GREEN 2,645,681
TELEPHONE EQUALIZER CIRCUIT
Filed April 11, 1950
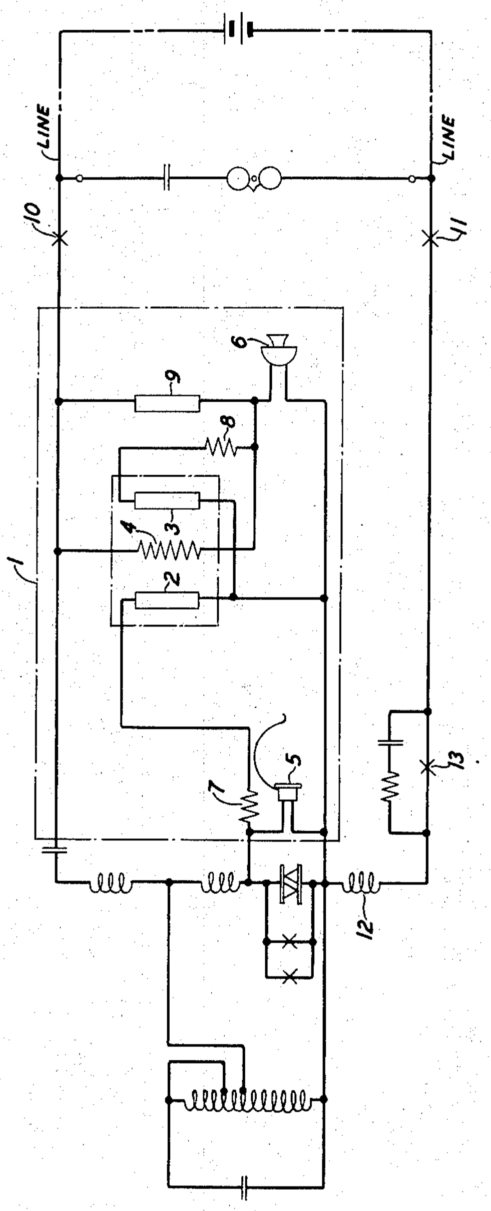
INVENTOR
E. I. GREEN
BY J. W. Schmied
ATTORNEY Patented July 14, 1953

2,645,681

UNITED STATES PATENT OFFICE 2,645,681

TELEPHONE EQUALIZER CIRCUIT

Estill I. Green, Short Hills, N. J., assignor to Bell Telephone Laboratories, Incorporated, New York, N. Y., a corporation of New York Application April 11, 1950, Serial No. 155,329

6 Claims. (Cl. 179—81)

This invention relates to improvements in volume equalizer circuits which may be embodied in telephone station sets. Such sets are ordinarily located at the telephone subscribers' premises and are used by telephone subscribers to communicate with distant parties.

An object of this invention is the improved equalization of a telephone station set so that the reception and transmission amplitude levels of telephone voice signals for said station set will be substantially independent of the length of transmission line connecting said station set to the switching center.

Another object of this invention is the elimination of circuit components in volume equalizer circuits which are susceptible to frequent failure from ordinary subscriber station set use.

Another object of this invention is an equalizer circuit which employs circuit components whose design combines the features of long life, mechanical ruggedness, and economy in cost.

A further object of this invention is the design of a volume equalizer circuit wherein the same circuit components may be used regardless of the distance between the subscriber's substation whose station set is to be equalized and the telephone office supplying the telephone talking current thereby simplifying the installation of equalizer circuit components in the different subscriber substations served by a particular telephone switching office.

As is well known, subscribers' substation sets are located at various distances, within a permissible range, from a telephone switching office and also in many cases conductors of different gauges are employed in the interconnections. As a result of these factors, as well as others, there is a considerable variation in the amplitude of signals received and transmitted by a subscriber unless some means are employed for compensating for the differences.

In a volume equalizer circuit disclosed in Patent 2,620,402, granted December 2, 1952, to Botsford, Boysen, Aikens, Dietze, Goodale and Inglis, a tungsten filament having a positive temperature coefficient of resistance and enclosed within a gas-filled vessel is connected in series with a subscriber's transmitter. Since the resistance of the tungsten filament varies directly with the direct current value passing therethrough and since the value of the direct current varies inversely with the length of the loop, this arrangement equalizes the voice currents generated by the subscriber's transmitter. In order to limit the voice current amplitudes in the receiver on short loops, a resistance element having a negative temperature coefficient of resistance is connected in shunt with the receiver. This shunt resistance element is thermally coupled to the tungsten filament by enclosing it within the vessel containing the tungsten filament. With this arrangement a short loop as compared to a long loop increases the current passing through the tungsten filament thereby increasing the heat energy transfer to the shunt resistance element so as to equalize the reception signal level.

In the circuit of the present invention, two negative temperature coefficient resistance elements are employed, one in shunt connection with the receiver and one in shunt connection with the transmitter of a telephone station set. Both of said shunt elements are thermally coupled to circuit means whose heat energy transfer to said shunt elements varies inversely with the resistance of the telephone loop connecting an equalized station set to a switching office thereby equalizing the substation transmitter and receiver. With such an arrangement independent equalization of both transmitter and receiver can be attained; whereas, in the arrangement disclosed in the application of Botsford et al., hereinbefore mentioned, dependent equalization exists between the transmitter and the receiver in that the transmitter equalizing element provides the heat energy variations controlling the equalization of the receiver.

A feature of the circuit of this invention is that station set maintenance problems are minimized because rugged elements capable of withstanding severe mechanical shock and vibration are employed, and because failure of the shunt resistance elements does not prevent operation of the station set. In equalizer circuits employing series resistance elements, a failure of an equalizer element will usually open the transmitter or receiver circuit thereby preventing operation of the station set.

Another feature of this invention is the independent volume equalization of a station set transmitter and receiver by the use of resistance components which shunt said transmitter and receiver.

Another feature of this invention is a volume equalizer circuit whose equalizing efficency can be made independent of the ambient temperature of the equalized station set.

Resistance elements such as tungsten filaments which operate at a high temperature usually become brittle; therefore, they are more easily susceptible to failure from mechanical shock or vibration, occasioned by dropping the set or rough handling of the station set cradle which usually houses the equalizer circuit components. An advantageous feature of the circuit of this invention is the element for heating the thermal resistance elements which operates at a much lower temperature than do series equalizer elements employing filaments of one type or another.

In a specific embodiment the equalizer circuit components are contained in a station set cradle with the appropriate circuit connections being made to the transmitter and receiver terminals. The equalizer elements should preferably be made of material having a high negative temperature coefficient of resistance. A heater element in the form of a coil of resistance wire or the like is thermally coupled to both of said resistance elements so as to vary the resistance thereof by winding the coil around the resistance elements. This heater element is connected to the substation circuit in such a manner that the heating thereof varies directly with the station set direct-current energizing current. The resistance elements are proportioned so as to change substantially instaneously in temperature and therefore in resistance with change in the current flow through the heater element. Variable resistors of this general type are commonly known in the art as "thermistors." By operating along an appropriate portion of the temperature-resistance characteristic of the resistance elements, the changes in the resistance of those elements will be such as to compensate for the difference in telephone station set energizing current caused by different loop lengths to the telephone switching office where the station set energizing current battery is usually located. Detailed explanation of the operation and characteristics of "thermistors" may be derived from the following articles: "Varistors: their characteristics and uses," J. A. Becker, Bell Laboratories Record, vol. 18, July 1940, pages 322-327; "Thermistors, their characteristics and uses," G. L. Pearson, Bell Laboratories Record, vol. 19, December 1940, pages 106-111.

In certain installations a station set may be subject to ambient temperature changes which would affect the resistance of the shunt circuit components. Such temperature changes are detrimental to the equalization efficiency of the station set because the ambient temperature of the thermal resistance elements should preferably be determined by the heat energy transfer from the heating element and not from such factors as room temperature. The circuit of this invention eliminates these undesirable characteristics by providing for a compensating resistance element to overcome the effects of station set ambient temperature upon equalization efficiency. In particular, a negative temperature coefficient resistance element is connected in shunt with the heating element which heats the receiver and transmitter resistance elements. Changes in the resistance of this compensation shunting element due to ambient station set temperature produce corresponding changes in the heating current of the heating element in such a magnitude as to compensate for the effects of the station set ambient temperature upon the thermal resistance elements which equalize the receiver and transmitter.

In the drawing the equalizer circuit of this invention is shown substituted for the tungsten filament equalizer circuit in the station set circuit disclosed in Fig. 1 of the application of Botsford et al. hereinbefore cited. Detailed reference will be made only to the circuit components which comprise the equalizer circuit disclosed herein or which closely cooperate with said equalizer circuit. The function and operation of the circuit components shown schematically but not referred to are described in detail in the aforementioned application of Botsford et al.

The improved equalizer circuit, together with the station set transmitter and receiver, is included within dotted line enclosure 1. Transmitter 6 is energized by the direct current from the line conductors through a circuit path which includes heating element 4. Heating element 4 is thermally coupled to negative temperature coefficient resistance elements 2 and 3, which shunt the receiver and transmitter, respectively, through current limiting resistors 7 and 8, by close physical positioning or any other arrangement for heat transfer known in the indirectly heated "thermistor" art. Negative temperature coefficient element 9 shunts heating element 4 and is to compensate for station set ambient temperature changes. If the equalizer circuit components are embodied within a station set cradle or the like, it is desirable that compensation element 9 be thermally isolated from heating element 4 otherwise the temperature compensation efficiency will be reduced.

The operation of the equalizer circuit is as follows: When the telephone handset, which mechanically couples the transmitter 6 to the receiver 5, is lifted from the station set cradle, switchhook contacts 10 and 11 are closed and line current from the battery flows through transmitter 6 in a circuit which includes a path which comprises the upper line conductor, switchhook contact 10, heating element 4, transmitter 6, winding 12, closed dial contact 13, switchhook contact 11, and the lower line conductor. Heating coil 4 provides heat energy for negative temperature coefficient elements 2 and 3 in direct proportion to the current flow therethrough. On a short telephone loop the heat energy transfer is greater than that created by a longer loop; therefore, resistance elements 2 and 3 will assume a smaller resistance value as compared to that which would be assumed on a longer loop. Due to the increased shunting effect of resistance element 3, the transmitter energizing current passing through the transmitter is maintained at a value substantially equal to that provided by a longer loop connection. The equalization of the energizing currents equalize the average voice current amplitudes generated by the transmitter. The reception signal amplitudes are kept substantially constant by the increased shunting effect of resistance element 2 on a short loop as compared to a long loop.

The inclusion of resistor 8, in series with resistance element 3, facilitates design of resistance element 3 and also tends to prevent a "run-away" condition which might occur because lowering of the resistance of element 3 increases the current through heating element 4 which further lowers the resistance of resistance element 3. Resistor 7 prevents the excessive shunting of receiver 5 by resistance element 2.

It can be readily understood that under certain conditions of extreme station set ambient temperatures the equalization of the station set will be affected by external conditions or factors which affect the temperature of thermal resistance elements 2 and 3 other than the temperature changes due to heat energy transfer from heating element 4. If the extreme ambient temperature persists during a telephone conversation, the average station set signal amplitude will be higher or lower than a preascertained desired level.

These undesirable effects on station set signal amplitudes can be substantially reduced by shunting heating element 4 with a negative temperature resistance element 9. Resistance element 9 should not be thermally coupled to heating element 4 as element 9 should preferably be affected only by external temperature conditions which also affect resistance elements 2 and 3. Likewise, resistance element 9 should be proportioned so as not to be excessively heated by current flow directly through said element 9. With such an arrangement, element 9 will compensate for external temperature conditions which affect the resistance of thermal elements 2 and 3.

It is to be understood that the above-described arrangements are illustrative of the application of the principles of the invention. Numerous other arrangements may be devised by those skilled in the art without departing from the scope of the invention.

What is claimed is:

1. In a telephone circuit including a receiver, a transmitter and a direct-current energizing source, a first resistance element having a negative temperature coefficient of resistance in shunt connection with said receiver, a second resistance element having a negative temperature coefficient of resistance in shunt connection with said transmitter, and a heating element physically positioned so as to transfer heat energy to said first and second resistance elements, said heating element being connected in series with said direct-current energizing source, said transmitter, and a metallic telephone conductor so that the direct current flowing through said heating element varies inversely to the physical length of said telephone conductor.

2. In a telephone substation circuit including a receiver, a transmitter, a direct-current energizing source and a transmission line, a first thermal resistance element whose resistance varies inversely to the temperature thereof, said resistance element being in shunt connection with said receiver, a second thermal resistance element whose resistance varies inversely to the temperature thereof, said second resistance element being in shunt connection with said transmitter, and a heating element thermally coupled to said first and second resistance elements so as to vary the resistance thereof, said heating element being connected to said direct-current energizing source over said transmission line so that the heat transfer from said heating element varies inversely to the ohmic resistance of said transmission line.

3. In a telephone substation circuit including a receiver, a transmitter and a direct-current energizing source, a first resistance element having a negative temperature coefficient of resistance and a first resistor being connected in series with one another, said first resistance element-first resistor combination shunting said receiver, a second resistance element having a negative temperature coefficient of resistance and a second resistor being connected in series with one another, said second resistance element-second resistor combination shunting said transmitter, a heating element thermally coupled to said first and second resistance elements so as to vary the temperature thereof in response to heat energy transfer thereto from said heating element, and means for varying the temperature of said heating element in response to the amplitude of a direct-current potential applied to said substation circuit by said energizing source.

4. In a telephone substation circuit including a receiver, a transmitter and a direct-current energizing source, a first resistance element having a negative temperature coefficient of resistance and a first resistor being connected in series with one another, said first resistance element-first resistor combination shunting said receiver, a second resistance element having a negative temperature coefficient of resistance and a second resistor being connected in series with one another, said second resistance element-second resistor combination shunting said transmitter, a heating element thermally coupled to said first and second resistance elements so as to vary the temperature thereof in response to heat energy transfer thereto from said heating element, means for varying the temperature of said heating element in response to the amplitude of a direct-current potential applied to said substation circuit by said energizing source, and a third resistance element having a negative temperature coefficient of resistance shunting said heating element so as to compensate for the effect of ambient temperature upon said first and second resistance elements.

5. In combination, a telephone connecting loop and a volume equalizer telephone circuit comprising a receiver, a transmitter, a negative temperature coefficient resistance element comprising a direct-current shunting path around said receiver, a negative temperature coefficient resistance element comprising a direct-current shunting path around said transmitter, and means controlled by the ohmic resistance of said loop for controlling the temperature of both of said elements.

6. In combination, a telephone connecting loop and a volume equalizer for compensating for the different interconnecting loop lengths between different subscriber stations and the telephone switching office serving said stations, comprising a transmitter, a receiver, a negative temperature coefficient resistance element shunting said receiver, a negative temperature coefficient resistance element shunting said transmitter, and a heating element controlled by the ohmic resistance of said loop for controlling the temperature of both of said resistance elements.

ESTILL I. GREEN.

References Cited in the file of this patent

UNITED STATES PATENTS

| Number | Name | Date |
|---|---|---|
| 2,030,987 | Herckmans | Feb. 18, 1936 |
| 2,287,998 | Johnson | June 30, 1942 |
| 2,288,049 | Tillman | June 30, 1942 |
| 2,360,233 | Hussey | Oct. 10, 1944 |
| 2,431,306 | Chatterjea | Sept. 25, 1947 |